United States Patent

Marzola et al.

[11] Patent Number: 6,165,302
[45] Date of Patent: Dec. 26, 2000

[54] PROCESS FOR REPAIRING PLASTIC COATINGS OF METAL PIPES

[75] Inventors: Roberto Marzola; Gian Luigi Rigosi, both of Ferrara, Italy

[73] Assignee: Montell North America Inc., Wilmington, Del.

[21] Appl. No.: 09/068,317

[22] PCT Filed: Aug. 4, 1997

[86] PCT No.: PCT/EP97/04230

§ 371 Date: Jul. 31, 1998

§ 102(e) Date: Jul. 31, 1998

[87] PCT Pub. No.: WO98/06511

PCT Pub. Date: Feb. 19, 1998

[30] Foreign Application Priority Data

Aug. 9, 1996 [IT] Italy .................................. MI96A1737

[51] Int. Cl.⁷ .............................. B05D 1/32; B05D 1/08; B29C 63/06; F16L 58/10
[52] U.S. Cl. .................................. 156/94; 138/99; 156/98
[58] Field of Search .......................... 156/94, 98; 138/97, 138/99; 29/402.11

[56] References Cited

U.S. PATENT DOCUMENTS

| | | |
|---|---|---|
| 3,315,348 | 4/1967 | Donovan et al. . |
| 3,697,720 | 10/1972 | Christopher . |
| 4,465,309 | 8/1984 | Nimke ........................................ 138/99 |
| 4,533,419 | 8/1985 | Pieslak ....................................... 138/99 |
| 4,803,104 | 2/1989 | Peigneur ..................................... 156/86 |
| 5,256,226 | 10/1993 | Marzola ................................. 427/207.1 |
| 5,536,349 | 7/1996 | Marzola ................................... 156/187 |
| 5,565,051 | 10/1996 | Marzola ..................................... 156/94 |
| 6,029,710 | 2/2000 | Rigosi et al. . |

FOREIGN PATENT DOCUMENTS

| | | |
|---|---|---|
| 80310 | 6/1983 | European Pat. Off. . |
| WO 95/33579 | 12/1995 | WIPO . |

Primary Examiner—Steven D. Maki

[57] ABSTRACT

Process for repairing plastic coatings of metal pipes, that allows the repairs to be done in a very short time, by applying, in specific operating phases, a polyolefin adhesive in powder form and polyolefin tapes, and then applying heat using an inert gas-shielded flame.

9 Claims, No Drawings

PROCESS FOR REPAIRING PLASTIC COATINGS OF METAL PIPES

BACKGROUND OF THE INVENTION

The present invention concerns a process for repairing plastic coatings of metal pipes, that allows the repairs to be made in a very short time.

Metal pipes, usually made of steel, coated with plastic material, are widely used for building pipelines conveying fluid materials, such as oil, natural gas, or water, even for a long distance.

Said pipelines must be able to withstand the most diverse environmental conditions, and, in certain cases, the high temperatures that are maintained in the proximity of pumping stations, for example, or that may be typical of certain fluids extracted from the subsoil.

In order to avoid weak points along the line it is necessary, therefore, that the damaged or removed segments of the plastic coating (where the pipes are welded together, for example) be repaired in such a way that the mechanical properties are as homogeneous as possible with the ones of the original coating.

As a response to said needs there are materials and methods known in the art which allow one to reach said objective with satisfactory results.

However, when the damaged portion of the coatings is quite extensive (for example when the coating has been removed in order to weld the pipes), one needs complicated repairing techniques requiring long times, and sophisticated and costly apparatus, such as induction ovens.

Now has been perfected a particularly fast and efficient repair method which allows one to limit the use of the induction oven to the heating phase preceding the application of the primer, and to carry out the other heating phases by using a flame shielded by inert gas (such as nitrogen, for example).

Said process is particularly suited for repairing polyolefin coatings, preferably polypropylene and/or polyethylene coatings.

SUMMARY OF THE INVENTION

Therefore, the object of the present invention is a process for repairing coatings on metal pipes the coatings being made of plastic materials (in particular polyolefin, preferably polypropylene and/or polyethylene coatings), the process comprising the following operating phases:

1) sanding (optionally preceded by removal of greasy and encrusting substances) of the exposed portion of the metal pipe (i.e., the one without coating),
2) application of shells made of a rigid material (such as steel, for example) on the edges of the existing coating surrounding the exposed portion,
3) heating the exposed portion by way of induction (in particular with induction ovens) to a temperature ranging from 140 to 270° C., preferably from 170 to 240° C.,
4) application on the exposed portion of an epoxy primer in powder form, and a polyolefin adhesive in powder form,
5) removal of the rigid shells and application of the coating, in the form of a polyolefin tape, by way of wrapping and heating the tape with an inert gas-shielded flame.

DETAILED DESCRIPTION OF PREFERRED EMBODIMENTS

Preferably, the size of the shells used in phase 2) is such that they overlap the existing coating by about 10 centimeters from the edges.

Said shells serve the purpose of preventing the coating from splitting and lifting during the heating of phase 3).

In phase 4), the epoxy primer in powder form and the polyolefin adhesive in powder form are preferably applied by using guns that are fed from a fluid bed by way of a pump which aspirates the powders using the Venturi effect.

Said guns can be equipped with a system for the electrostatic charge of the powders.

Various alternative solutions are possible for phase 5). In particular phase 5) may comprise the following steps:

5i) removal of the rigid shells,
5ii) heating the exposed portion and the surrounding part of the existing coating by way of an inert gas-shielded flame,
5iii) application of a polyolefin adhesive in powder form on the existing coating by way of flame spraying,
5iv) application, by wrapping, of a polyolefin tape (in particular a polypropylene and/or polyethylene tape) having preferably a thickness of 800 microns, on the exposed portion and on the surrounding area of the existing coating, preferably overlapping the edges of the tape being wrapped by 50–70% of its width,
5v) heating the entire wrapping with the above mentioned flame, and optionally,
5vi) cooling said wrapping, for example with atomized water.

In step 5iv), the area of the existing coating, surrounding the exposed portion, which is covered with the tape consists preferably of at least 1.5–2 turns of said tape at both sides of the pipe surrounding said exposed portion.

As an alternative, phase 5) may comprise the following steps:

5.1) optional application, by flame spraying, of an additional layer of polyolefin adhesive in powder form (in the case that one would want to increase the thickness of the coating),
5.2) application, by wrapping, of a polyolefin tape (in particular a polypropylene and/or polyethylene tape) on the exposed portion and on the shells made of rigid material, preferably with an overlapping of about 50% of the width of the tape, both at the edges of the tape being wrapped as well as where said tape is wrapped around the shells,
5.3) removing said shells as well as the portions of the tape overlapping the shells,
5.4) heating, by way of an inert gas-shielded flame, the entire wrapping as well as the area around the existing coating and the coating just applied, and applying a polyolefin adhesive in powder form on the latter area by way of flame spraying.

The purpose of step 5.4) is to form a bond between the existing coating and the one just applied.

As a further alternative phase 5) may comprise the following steps:

5a) removal of the rigid shells,
5b) application by way of flame spraying of an additional layer of polyolefin adhesive in powder form, preferably having a thickness of about 500–600 microns,
5c) application of a polyolefin tape (in particular a polypropylene and/or polyethylene tape), without overlapping it on the existing coating, said tape having been preheated (preferably to 80–90° C.), being as wide as the entire exposed portion, and preferably having a thickness of 1.2–1.3 mm, 5d) heating the area where the existing coating meets the one just applied, by way of an inert gas-shielded flame, and applying a polyolefin adhesive in powder form to said area by way of flame spraying.

Step 5c) requires a certain degree of accuracy in applying the tape on the area to be coated without incorporating air bubbles.

Step 5d) serves the purpose of forming a bond between the existing coating and the one just applied.

In all the steps above that require flame heating, excluding the particular case of flame spraying, the temperature of said heating ranges preferably from 80 to 200° C.

As mentioned above, the flame used is shielded by an inert gas, such as nitrogen for example.

The purpose of said shielding is to avoid or reduce the contact between the air and the polymer that is melted by the flame, thus avoiding the oxidation and degradation of the polymer, which causes a marked reduction of the life of the coating, especially when the operating temperature of the coated pipe exceeds 80° C.

Said shielded flame can be obtained with guns or sprayers that have a central nozzle for spraying powders, and some concentric circles of nozzles.

A combustible gas (such as methane, propane, butane for example) is fed through one or more circles of nozzles, while the inert gas is fed through one or more concentric circles of nozzles to provide the shielding. Thus one obtains a shielded flame (i.e., capable of preventing the degradation of the polymer with which it comes in contact) by ignition of the combustible gas.

Said guns or sprayers are also used for the application of the polyolefin adhesive in powder form by way of the flame spraying method. In this case the surface of the powder particles of the polyolefin adhesive is heated to a temperature ranging from 50 to 240° C. by way of the flame.

Preferably, the adhesive in powder form is made of a polyolefin composition comprising by weight:

A) from 30% to 94%, preferably from 50% to 85%, of polypropylene or polyethylene (HDPE, LDPE, or LLDPE), or a propylene/ethylene or propylene/ethylene/$C_4$–$C_{10}$ α-olefin crystalline random copolymer;

B) from 0% to 70%, preferably from 5% to 40%, of an ethylene/propylene or ethylene/1-butene elastomeric polymer;

C) from 0.5% to 10%, preferably from 2% to 4%, of polypropylene or polyethylene (HDPE, LDPE, or LLDPE) modified with polar groups (in particular by way of partial or total grafting of maleic anhydride or isophoronebismaleamic acid) in quantities ranging from 0.5 to 10%;

D) from 0% to 0.5%, preferably from 0.1 to 0.5%, of a nucleating agent, such as dibenzylidenesorbitol or talc, for example;

E) from 0% to 10%, preferably from 6% to 10%, of titanium dioxide;

said composition having a melt index L (ASTM D 1238 L) ranging from 3 to 150, preferably from 5 to 90 g/10 minutes if the composition is predominantly polypropylene based, or a melt index E (ASTM D 1238 E) ranging from 0.1 to 20, preferably from 0.5 to 15 g/10 minutes if the composition is predominantly polyethylene based, and being in powder form with a diameter of the particles not exceeding 600 micrometers, with the following particle size distribution (percentages by weight):

not more than 25%, preferably not more than 4%, of the powder having a diameter of the particles ranging from 300 to 450 micrometers;

not more than 10%, preferably not more than 0.6%, of the powder having a diameter of the particles greater than 450 micrometers.

Preferably, a "predominantly polypropylene based" composition is a composition where component (A) is made of polypropylene or a propylene/ethylene or propylene/ethylene/$C_4$–$C_{10}$ α-olefin crystalline random copolymer, while a "predominantly polyethylene based" composition is a composition where component (A) is made of polyethylene.

Examples of $C_4$–$C_{10}$ α-olefins optionally present in component (A) are: 1-butene; 1-hexene; 1-octene; 4-methyl-1-pentene.

When present, the $C_4$–$C_{10}$ α-olefins range in quantity from 2% to 10% by weight.

Examples of the above mentioned polyolefin composition are described in published European patent application n. 603 906.

The polyolefin tape mentioned above can be essentially made of a propylene or ethylene homopolymer, or a copolymer of propylene with ethylene and/or higher α-olefins (in particular $C_4$–$C_8$), or a copolymer of ethylene with the above mentioned higher α-olefins, or a blend of the above mentioned (co)polymers.

Examples of $C_4$–$C_8$ α-olefins are the ones given above for the polyolefin adhesive in powder form.

Other components commonly used in the art, such as fillers or pigments, may be present in the composition of the polyolefin tape.

In particular, the polyolefin tape can be made of a polyolefin composition comprising:

a) 10–60, preferably 20–50 parts by weight of polypropylene homopolymer with an isotactic index greater than 90, particularly ranging from 95 to 98, or a crystalline copolymer of propylene with ethylene and/or a $CH_2$=CHR α-olefin where R is an alkyl radical with 2–6 carbon atoms, containing more than 85% by weight of propylene, and having an isotactic index greater than 85%;

b) 10–40 parts by weight of a polymer fraction containing ethylene, insoluble in xylene at ambient temperature;

c) 30–60, preferably 30–50 parts by weight of a amorphous ethylene-propylene copolymer fraction optionally containing minor proportions of a diene, soluble in xylene at ambient temperature, and containing 40–70% by weight of ethylene, said polyolefin composition being cross-linked by way of grafting an alkenyl derivative of alkoxysilane and reaction with water, until one obtains hot set values, according to regulation CEI 20–31, lower than 175%, preferably lower than 120%, at 200° C., and lower than 10% at 23° C.

Polymer compositions comprising (a)+(b)+(c) are described in published European patent application n. 400333.

Normally the total content of polymerized ethylene in the above mentioned compositions ranges from 20 to 60% by weight, In fraction (a), the $CH_2$=CHR α-olefin where R is an alkyl radical with 2–6 carbon atoms is preferably selected from 1-butene, 1-pentene, 4-methyl-1-pentene.

The diene in fraction (c) is preferably selected from butadiene, 1,4-hexadiene, 1,5-hexadiene, ethylidene-1-norbornene.

The molecular weight of the various fractions (determined by measuring the intrinsic viscosity in tetrahydronaphthaline at 135° C.) varies in function of the nature of the components and the total melt index of the composition.

Preferably it is comprised within the following limits:
0.5–3 dl/g for fraction (a);
2–8 dl/g for fraction (b)+(c).

The electron microscopic exam of the compositions indicates that the dispersed phase is made of the amorphous ethylene-propylene copolymer, and its average particle size is less than 2 microns.

Preferred examples of alkenyl derivatives of alkoxysilanes used to obtain the cross-linking of the above mentioned compositions are vinyltriethoxysilane, allyltriethoxysilane, and divinyldimethoxysilane.

Generally the alkenyl derivatives of alkoxysilanes are grafted to the composition by way of extrusion in the presence of peroxides.

Examples of the above mentioned polyolefin composition are described in published European patent application n. 619 343.

As an alternative to the above mentioned cross-linked composition one can use, for the polyolefin tape, appropriately cross-linked polyethylene (HDPE, LDPE, or LLDPE), using, for example, the above mentioned grafting technique of an alkenyl derivative of alkoxysilane and reaction with water.

According to a preferred variation, the polyolefin tape comprises a layer essentially made of the above mentioned polyolefin materials, and an additional layer, coextruded for example, of a polyolefin adhesive.

Naturally, during the application of the tape the adhesive polyolefin layer is made to come in contact with the surface to be coated.

Preferred examples of the polyolefin adhesive composition that can be used for the above mentioned additional layer of the polyolefin tape are the ones previously described for the polyolefin adhesive in powder form.

As a way of example, the repair of the coating of a welded joint between two steel pipes, having a diameter of 508 mm and a thickness of 8 mm, from which the preexisting polypropylene coating around the joint has been removed, may be carried out using the process of the present invention comprising the steps from 5i) to 5vi), using the following operating times:

phase 1): 60 seconds
phases 2 and 3): 60 seconds
phase 4): 60 seconds
steps 5i), 5ii), and 5iii) 40 seconds
step 5iv): 60 seconds
step 5v): 40 seconds
step 5vi): 40 seconds thus obtaining a coating, in the area being repaired, with a thickness of 2.5 mm ca.

This shows the operational speed that one can obtain with the process of the present invention.

What is claimed is:

1. A process for repairing an existing plastic coating of a metal pipe which has a portion of the coating removed, thereby exposing a portion of the metal pipe, comprising the following steps:
    A) sanding the exposed portion of the metal pipe which is surrounded by an unremoved portion of the existing plastic coating,
    B) applying shells made of a rigid material on edges of the existing plastic coating surrounding the exposed portion of the metal pipe,
    C) heating the exposed portion of the metal pipe by induction to a temperature ranging from 140° to 270° C.,
    D) applying an epoxy primer in powder form, and a polyolefin adhesive in powder form, onto the exposed portion of the metal pipe,
    E) removing the rigid shells,
        applying a replacement coating by wrapping a polyolefin tape over the epoxy primer and the polyolefin adhesive and heating the polyolefin tape with an inert gas-shielded flame wherein the rigid shells are removed before or after the wrapping with the polyolefin tape.

2. The process of claim 1, wherein the sanding step is preceded by removing greasy or encrusted substances from the exposed portion of the metal pipe.

3. The process of claim 1, wherein the step of applying the replacement coating includes the following steps:
    1) removing the rigid shells and then heating the exposed portion of the metal pipe and a surrounding part of the existing plastic coating using an inert gas-shielded flame,
    2) applying a polyolefin adhesive in powder form onto the existing coating using a flame spraying technique,
    3) wrapping the polyolefin tape onto the exposed portion and the surrounding part of the existing plastic coating, and
    4) heating the entire wrapping with an inert gas-shielded flame, and optionally, cooling said wrapping.

4. The process of claim 1, wherein the step of applying the replacement coating includes the following steps:
    1) wrapping the polyolefin tape on the exposed portion of the metal pipe and on the rigid shells,
    2) removing a portion of the polyolefin tape overlapping the rigid shells and removing the rigid shells,
    3) heating the entire remaining wrapping and an area where the existing plastic coating meets the polyolefin tape with an inert gas-shielded flame, and
    4) applying a polyolefin adhesive in powder form onto the area by flame spraying.

5. The process of claim 4, wherein an additional layer of polyolefin adhesive in powder form is applied by flame spraying before wrapping the polyolefin tape.

6. The process of claim 1, wherein the step of applying the replacement coating includes the following steps:
    1) removing the rigid shells and then applying an additional layer of polyolefin adhesive in powder form by flame spraying,
    2) preheating the polyolefin tape and applying the preheated polyolefin tape without overlapping it on the existing coating, the tape being as wide as the exposed portion,
    3) heating an area where the existing coating meets the polyolefin tape with an inert gas-shielded flame, and
    4) applying a polyolefin adhesive in powder form to the area by flame spraying.

7. The process of claim 1, where said polyolefin adhesive in powder form contains a polyolefin composition comprising by weight:
    A) from 30% to 94% of polypropylene or polyethylene or a propylene/ethylene or propylene/ethylene/$C_4$–$C_{10}$ α-olefin crystalline random copolymer;
    B) from 0% to 70% of an ethylene/propylene or ethylene/1-butene elastomeric copolymer;
    C) from 0.5% to 10% of polypropylene or polyethylene modified with polar groups in quantities ranging from 0.5 to 10%;

D) from 0% to 0.5% of a nucleating agent;

E) from 0% to 10% of titanium dioxide;

said composition having a melt index L (ASTM D 1238, condition L) ranging from 3 to 150 g/10 minutes if the composition is predominantly polypropylene based, or a melt index E (ASTM D 1238, condition E) ranging from 0.1 to 20 g/10 minutes if the composition is predominantly polyethylene based, and being in powder form with a diameter of the particles not exceeding 600 micrometers, with the following particle size distribution:

i) not more than 25% by weight of the powder having a diameter of the particles ranging from 300 to 450 micrometers;

ii) not more than 10% by weight of the powder having a diameter of the particles greater than 450 micrometers.

8. The process of claim 1, where the polyolefin tape is substantially made of a propylene or ethylene homopolymer, or a copolymer of propylene with ethylene and/or higher α-olefins, or a copolymer of ethylene with higher α-olefins, or a mixture thereof.

9. The process of claim 8, wherein the polyolefin tape further comprises an additional layer of polyolefin adhesive.

* * * * *